United States Patent [19]
Netzer

[11] Patent Number: 6,123,054
[45] Date of Patent: Sep. 26, 2000

[54] SEALING RING FOR RECIPROCATING MACHINE PARTS

[75] Inventor: Jürgen Netzer, Burscheid, Germany

[73] Assignee: CR Elastomere GmbH, Leverkusen, Germany

[21] Appl. No.: 09/035,977

[22] Filed: Mar. 6, 1998

[30] Foreign Application Priority Data

Mar. 6, 1997 [DE] Germany .............. 197 09 170

[51] Int. Cl.[7] .................................................... F02N 3/00
[52] U.S. Cl. ........................................................ 123/188.6
[58] Field of Search ........................ 123/188.6, 188.3; 277/502

[56] References Cited

U.S. PATENT DOCUMENTS

| | | | |
|---|---|---|---|
| 3,480,286 | 11/1969 | Kostka | 123/188.6 |
| 3,531,134 | 9/1970 | Kammeraad | 123/188.6 |
| 4,125,265 | 11/1978 | Grzesiak . | |
| 4,531,483 | 7/1985 | Vossieck et al. | 123/188.6 |
| 4,695,061 | 9/1987 | Meisner et al. . | |
| 4,993,379 | 2/1991 | Viazzi | 123/188.6 |
| 5,237,971 | 8/1993 | Worsley | 123/188.6 |
| 5,558,056 | 9/1996 | Sakata | 123/188.6 |

*Primary Examiner*—Marguerite McMahon
*Assistant Examiner*—Jason Benton
*Attorney, Agent, or Firm*—Burns, Doane, Swecker & Mathis, LLP

[57] ABSTRACT

A seal for being mounted on a reciprocating machine part to seal the machine part includes a sealing element made of elastomer material. The sealing element has a sealing lip defined by two surfaces that intersect at a sealing edge for resting in a sealing manner against the outer surface of the machine part. One of the two surfaces includes a first section and a second section. The first section is inclined at a first angle of inclination with respect to the central axis of the sealing element while the second section is inclined at a second angle of inclination with respect to the central axis of the sealing element, and with the first and second angles of inclination being different from one another.

24 Claims, 2 Drawing Sheets

SEALING RING FOR RECIPROCATING MACHINE PARTS

The present application claims priority under 35 U.S.C. § 119 with respect to German Application No. P 197 09 170.9, the entire content of which is incorporated herein by reference.

FIELD OF THE INVENTION

The present invention generally relates to a seal. More particularly, the present invention relates to a valve shaft seal for reciprocating machine parts such as a valve shaft of a combustion engine.

BACKGROUND OF THE INVENTION

In modern combustion engines, to prevent the unregulated passage of lubricating oil through the guide slot towards the valve seat, the valve shafts of the combustion engine are sealed on the valve drive side. The seals for the valve shafts function initially to block the oil coming from the valve drive so that the oil is prevented from entering the valve guide slot. It is necessary to prevent excess stripping because otherwise, in the absence of sufficient lubrication, high wear can occur on the valve shaft and guide. Valve shaft seals thus also function as oil metering devices.

Known seals for valve shafts in combustion engines consist of a sealing element fabricated of an elastomer material. The sealing element is provided with a spring-loaded sealing lip having a sealing edge that rests in a sealing manner on the valve shaft. The sealing edge is formed by two surfaces of the sealing lip which have a frustum shape and are angled relative to each other. The sealing lip strips the oil discharged from the valve chamber during reciprocation. By varying the spring preload and the sealing lip design, it is possible to reduce the oil passage at the valves to the small amount required for lubrication. In this way, the most useful amount for each motor is achieved. An important characteristic of the seal is the angle of the surface of the sealing edge that faces the valve chamber. In most cases, this angle $\alpha$ has a value of 40° to 45° relative to the axis of the valve shaft. Even smaller angles up to 30° have been used for special applications.

The metering of oil for valve shaft sealing rings, particularly in the case of sealing ring designs with a shallow angle $\alpha$, is strongly influenced by the oil supply at the valve. However, the oil supply varies from valve to valve because of the construction of the cylinder head, particularly the position of the inflow bore. The oil supply from valve to valve also varies because of the oil pump drive, also determined by the load point of the motor.

Particularly in the case of valve shaft sealing rings designed with a small contact angle ($\alpha<35°$), a gap that greatly tapers off is present on the oil side of the sealing ring. Thus, depending on the oil supply, a dynamic pressure is generated when the valve opens, and this influences the amount of oil passing through the valve. This phenomenon is rarely known to occur in standard valve shaft sealing rings having contact angles $\alpha$ greater than 40°.

In light of the foregoing, a need exists for a valve shaft sealing ring in which, independently from the oil supply, the same dynamic pressure is substantially always present in the tapering gap in front of the sealing edge, while excess oil is stripped.

SUMMARY OF THE INVENTION

In light of the foregoing, the present invention provides a valve shaft seal for being mounted on a valve shaft of a combustion engine, wherein the valve shaft seal includes a sealing ring fabricated of elastomer material. The sealing ring includes a sealing lip defined by two inclined surfaces intersecting at a sealing edge for resting in a sealing manner against an outer surface of the valve shaft. One of the inclined surfaces is defined by a first section and a second section, with the first section being located closer to the sealing edge than the second section. The first section is inclined at a first angle of inclination with respect to the central axis of the sealing ring while the second section is inclined at a second angle of inclination with respect to the central axis of the sealing ring, and with the first angle of inclination being less than 35° and the second angle of inclination being greater than 40°.

Another aspect of the invention involves a seal for being mounted on a reciprocating machine part to seal the machine part, with the seal including a sealing element made of elastomer material. The sealing element has a sealing lip defined by two surfaces that intersect at a sealing edge for resting in a sealing manner against the outer surface of the machine part. One of the two surfaces includes a first section and a second section. The first section is inclined at a first angle of inclination with respect to the central axis of the sealing element while the second section is inclined at a second angle of inclination with respect to the central axis of the sealing element, and with the first angle of inclination being less than 35° and the second angle of inclination being greater than 40°.

According to another aspect of the invention, a seal for being mounted on a reciprocating machine part includes a sealing element made of elastomer material and having a sealing lip defined by two surfaces that intersect at a sealing edge for resting in a sealing manner against an outer surface of the machine part. The first and second surfaces defining the sealing lip are located axially closer to a first end of the sealing element than to a second end of the sealing element, and the first surface is located axially closer to the first end of the sealing element than the second surface. The first surface includes a first section and a second section, with the first section being inclined at a first angle of inclination with respect to the central axis of the sealing element and the second section being inclined at a second angle of inclination with respect to the central axis of the sealing element, and with the first and second angles of inclination being different from one another.

BRIEF DESCRIPTION OF THE DRAWING FIGURES

The foregoing and additional features and characteristics will become more apparent from the following detailed description considered with reference to the accompanying drawing figures in which like elements designate like reference numerals and wherein:

FIG. 1 is a is a cross-sectional view of a valve shaft sealing ring mounted on a reciprocating valve shaft; and FIG. 2 is an enlarged cross-sectional view of a portion of the sealing ring illustrating a modification to the configuration shown in FIG. 1.

DETAILED DESCRIPTION OF THE INVENTION

The following detailed description describes a preferred embodiment of the seal of the present invention in the context of a valve shaft in a combustion engine. However, this description is for purposes of illustration and it is to be understood that the present invention is not limited in this manner. Rather, the present invention is very generally suitable for and has application to seals for reciprocating machine parts.

Figure 1:
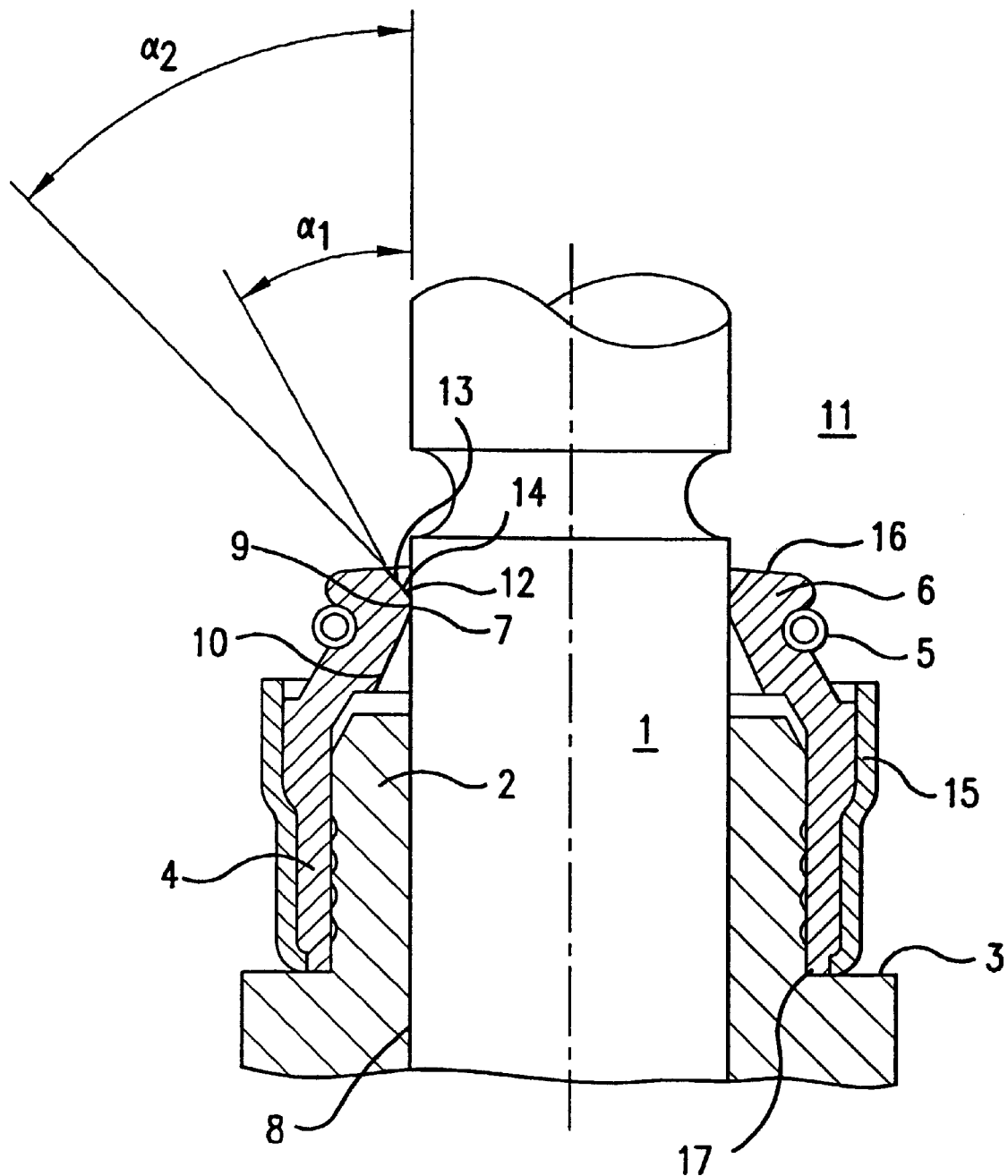

As seen with reference to FIG. 1, a valve guide 2 is mounted on and encircles a valve shaft 1. The valve guide 2 is provided with a radially outwardly extending shoulder 3. A sealing element or sealing ring 4 is set onto the valve guide 2 to seal the valve shaft 1. The sealing element 4 is mounted on the valve guide 2 so that the sealing element 4 encircles the portion of the valve guide 2 located above the shoulder 3. One end of the sealing element 4 rests on the shoulder 3 while the opposite end of the sealing element 4 extends beyond the end of the valve guide 2.

The sealing element 4 is made from elastomer material and is provided with a sealing lip 6 that includes a sealing edge 7. The sealing lip 6 rests in a preloaded manner with the sealing edge 7 contacting the mantle surface or outer surface 8 of the valve shaft 1. The sealing edge 7 is formed by two inclined or frustum-shaped surfaces 9, 10 which are angled relative to each other. The two inclined surfaces 9, 10 are inclined with respect to the central axis of the sealing element 4. The two inclined or frustum-shaped surfaces 9, 10 intersect one another at the sealing edge 7.

As can be seen from the drawing figure, the two inclined surfaces 9, 10 forming the sealing edge 7 are located closer to one end 16 of the sealing ring than the other end 17. The inclined surface 9 facing the oil side 11 (i.e., the inclined surface 9 located closer to the one end 16 of the sealing ring than the other end 17) is divided into two sections or two surface portions 12, 13. The two sections 12, 13 have different angles of inclination $\alpha_1$ and $\alpha_2$ with respect to the central axis of the sealing element 4. The different angles of incline result in an edge 14. It is preferable that the angle $\alpha_1$ be smaller than 35°, while the angle $\alpha_2$ is greater than 40°. In a preferred embodiment, the angle of incline $\alpha_1$ of the first section 12 closest to the sealing edge 7 is about 20° while the angle of incline $\alpha_2$ of the adjoining section 13 located more remote from the sealing edge 7 is about 45°.

The sealing lip 6 is preloaded by way of a tension coil spring 5. The spring 5 encircles a portion of the sealing element 4 at an axial location beyond the end of the valve guide 2. The outer surface of the sealing element 4 can be provided with a groove for seating the tension coil spring 5. The axial position of the tension coil spring 5 is adjacent to the axial position of the sealing edge 7, preferably slightly below as shown in the drawing figure. The tension coil spring 5 is designed to preload the sealing lip and thereby press the sealing edge 7 against the outer surface of the valve shaft 1.

To reinforce the sealing element 4, a reinforcement ring 15 can be provided. The reinforcement ring 15 encircles the outer surface of the sealing element 4.

Figure 2:
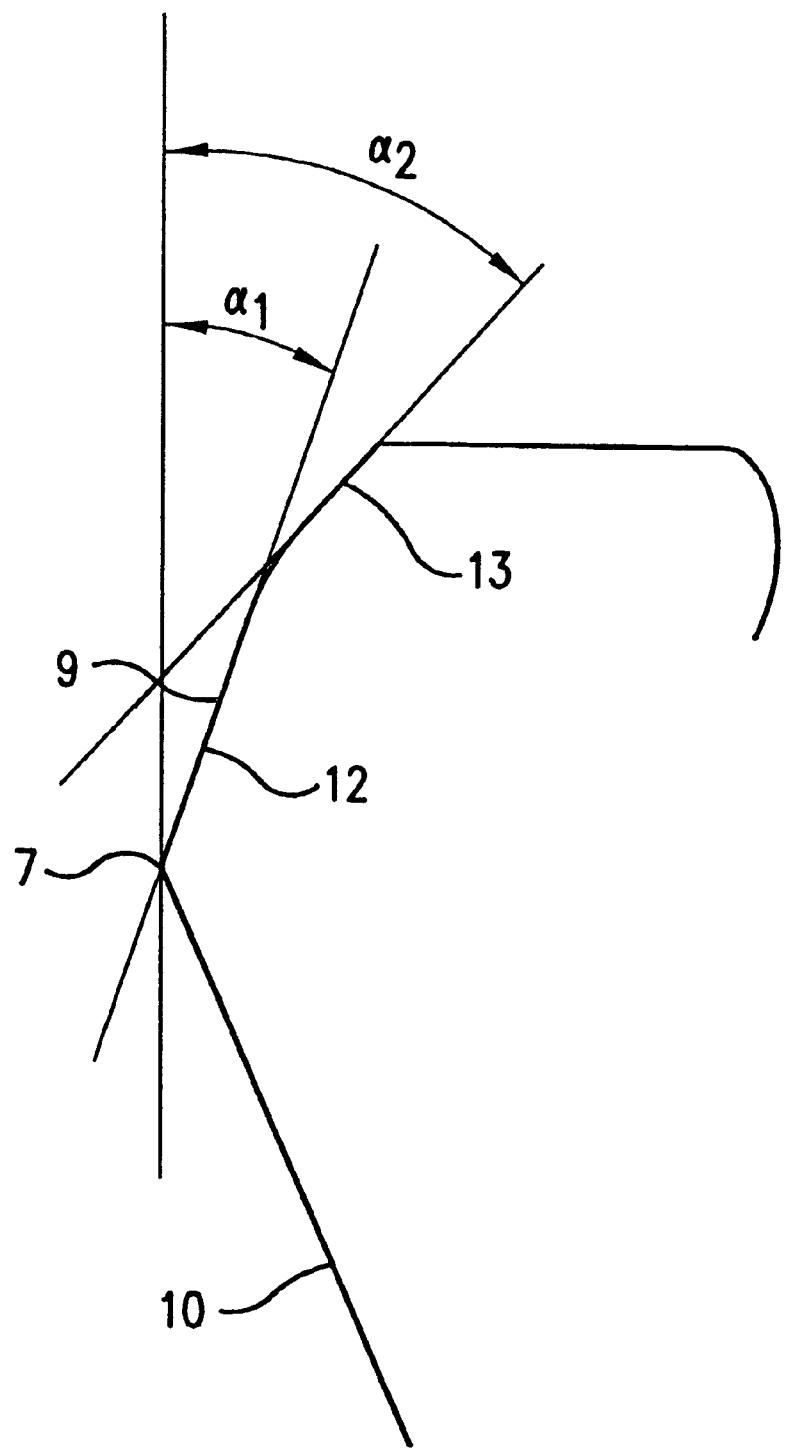

It can thus be seen that the seal of the present invention is designed so that the frustum-shaped surface forming the sealing edge is divided into several sections possessing different angles of inclination with respect to a common axis parallel to the longitudinal axis of the valve shaft. The angles of inclination of the individual sections forming the frustum-shaped surface are designed to be increasingly larger from the sealing edge outward. This creates a stepped sealing edge which has a shallow contact angle near the contact point with the valve shaft and, depending on the required oil metering and the minimal oil supply, changes into a steeper angle along its outward extent. This is advantageous in that it helps ensure that the same dynamic pressure is substantially always present in the tapering slot, independently from the oil supply, while excess oil is stripped away in the area of the steeper angle. In addition to the sharp edge-shaped design of the transition from one section 12 to the other section 13 which is shown in FIG. 1, it is also possible to employ a continuous rounded transition between the two sections 12, 13 as shown in FIG. 2.

The principles, a preferred embodiment and the mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. Valve shaft seal for being mounted on a valve shaft of a combustion engine, comprising a sealing ring fabricated of elastomer material and possessing a central axis, said sealing ring including a sealing lip defined by two inclined surfaces intersecting at a sealing edge for resting in a sealing manner against an outer surface of the valve shaft, one of the inclined surfaces being defined by a first section and a second section, the first section being located closer to the sealing edge than the second section, said first section being inclined at a first angle of inclination with respect to the central axis of the sealing ring, said second section being inclined at a second angle of inclination with respect to the central axis of the sealing ring, said first angle of inclination being less than 35° and the second angle of inclination being greater than 40°.

2. Valve shaft seal according to claim 1, including a sharp edge transition between the first and second sections.

3. Valve shaft seal according to claim 1, including a rounded transition between the first and second sections.

4. Valve shaft seal according to claim 1, including a tension coil spring encircling a portion of the sealing ring.

5. Valve shaft seal according to claim 4, wherein the tension coil spring is positioned in a groove formed in an outer surface of the sealing ring.

6. Valve shaft seal according to claim 1, wherein the sealing ring possesses an outer surface, and including a reinforcement ring mounted on the sealing ring and encircling a portion of the outer surface of the sealing ring.

7. Seal for being mounted on a reciprocating machine part to seal the machine part, comprising a sealing element made of elastomer material, said sealing element including a central axis, said sealing element having a sealing lip defined by two surfaces that intersect at a sealing edge for resting in a sealing manner against an outer surface of the machine part, one of the two surfaces including a first section and a second section, the first section being inclined at an angle of inclination of less than 35° with respect to the central axis of the sealing element, the second section being inclined at an angle of inclination of greater than 40° with respect to the central axis of the sealing element.

8. Seal according to claim 7, including a sharp edge transition between the first and second sections.

9. Seal according to claim 8, including a rounded transition between the first and second sections.

10. Seal according to claim 7, including a tension coil spring encircling a portion of the sealing element.

11. Seal according to claim 7, wherein the tension coil spring is positioned in a groove formed in an outer surface of the sealing element.

12. Seal according to claim 10, wherein the first section is located closer to the sealing edge than the second section, and said tension coil spring being positioned axially adjacent the sealing edge.

13. Seal according to claim 7, wherein the sealing element possesses an outer surface, and including a reinforcement ring mounted on the sealing element and encircling a portion of the outer surface of the sealing element.

14. Seal for being mounted on a reciprocating machine part to seal the machine part, comprising a sealing element made of elastomer material, said sealing element including a central axis, the sealing element including first and second ends, said sealing element having only a single sealing lip defined by first and second surfaces that intersect at a sealing edge for resting in a sealing manner against an outer surface of the machine part so that the sealing element contacts the outer surface of the machine part only at said sealing edge, said first and second surfaces defining the sealing lip being located axially closer to the first end of the sealing element than to the second end of the sealing element, the first surface being located axially closer to said first end of the sealing element than the second surface, the first surface including a first section and a second section, an intersection of the first and second sections being spaced from the first end of the sealing element, the first section being inclined at a first angle of inclination with respect to the central axis of the sealing element, the second section being inclined at a second angle of inclination with respect to the central axis of the sealing element, the first and second angles of inclination being different from one another.

15. Seal according to claim 14, wherein the sealing element possesses an outer surface, and including a reinforcement ring mounted on the sealing element and encircling a portion of the outer surface of the sealing element.

16. Seal according to claim 14, including a tension coil spring encircling a portion of the sealing element for urging the sealing edge into sealing engagement with the outer surface of the machine part.

17. Seal according to claim 14, wherein said first angle of inclination is less than said second angle of inclination.

18. Seal according to claim 17, wherein said first section is located closer to the sealing edge than said second surface.

19. Seal according to claim 17, wherein said first angle of inclination is less than 35° and said second angle of inclination is greater than 40°.

20. Seal mounted on a reciprocating machine part to seal the machine part, comprising a sealing element made of elastomer material, said sealing element including a central axis, the sealing element including first and second ends, said sealing element having only a single sealing lip defined by first and second surfaces that intersect at a sealing edge which rests in a sealing manner against an outer surface of the machine part so that said sealing element contacts the outer surface of the machine part only at the sealing edge, said first and second surfaces defining the sealing lip being located axially closer to the first end of the sealing element than to the second end of the sealing element, the first surface being located axially closer to said first end of the sealing element than the second surface, the first surface including a first section and a second section, the first section being inclined at a first angle of inclination with respect to the central axis of the sealing element, the second section being inclined at a second angle of inclination with respect to the central axis of the sealing element, the first and second angles of inclination being different from one another, said first and second sections also being inclined with respect to an end surface of the sealing element located at the first end of the sealing element.

21. Seal according to claim 20, wherein said first angle of inclination is less than said second angle of inclination.

22. Seal according to claim 20, wherein the sealing element possesses an outer surface, and including a reinforcement ring mounted on the sealing element and encircling a portion of the outer surface of the sealing element.

23. Seal according to claim 20, including a tension coil spring encircling a portion of the sealing element for urging the sealing edge into sealing engagement with the outer surface of the machine part.

24. Seal according to claim 20, wherein said first section is located closer to the sealing edge than said second surface.

* * * * *